(12) United States Patent
Kito et al.

(10) Patent No.: US 10,829,626 B2
(45) Date of Patent: Nov. 10, 2020

(54) DISPERSION DIAMETER ADJUSTMENT METHOD AND THERMOPLASTIC RESIN COMPOSITION

(71) Applicant: TOYOTA BOSHOKU KABUSHIKI KAISHA, Aichi (JP)

(72) Inventors: Masayuki Kito, Aichi (JP); Goro Takahashi, Aichi (JP); Toshihiro Suzuki, Aichi (JP); Mitsutaka Sako, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/086,696

(22) PCT Filed: Mar. 15, 2017

(86) PCT No.: PCT/JP2017/010533
§ 371 (c)(1),
(2) Date: Sep. 20, 2018

(87) PCT Pub. No.: WO2017/169813
PCT Pub. Date: Oct. 5, 2017

(65) Prior Publication Data
US 2019/0100645 A1    Apr. 4, 2019

(30) Foreign Application Priority Data
Mar. 31, 2016 (JP) ................................ 2016-072743

(51) Int. Cl.
| | | |
|---|---|---|
| *C08L 23/26* | (2006.01) | |
| *C08L 77/00* | (2006.01) | |
| *C08J 3/20* | (2006.01) | |
| *C08L 23/02* | (2006.01) | |
| *C08J 3/00* | (2006.01) | |
| *C08L 23/12* | (2006.01) | |

(52) U.S. Cl.
CPC .............. *C08L 23/26* (2013.01); *C08J 3/005* (2013.01); *C08J 3/20* (2013.01); *C08L 23/02* (2013.01); *C08L 23/12* (2013.01); *C08L 77/00* (2013.01); *C08L 2201/56* (2013.01); *C08L 2205/08* (2013.01)

(58) Field of Classification Search
None
See application file for complete search history.

(56) References Cited

U.S. PATENT DOCUMENTS

| | | |
|---|---|---|
| 2003/0124448 A1 | 7/2003 | Shinzo et al. |
| 2006/0148987 A1 | 7/2006 | Schauder et al. |
| 2012/0028047 A1 | 2/2012 | Imai et al. |
| 2014/0107273 A1 | 4/2014 | Ochiai et al. |
| 2014/0364569 A1 | 12/2014 | Kito et al. |
| 2014/0371394 A1 | 12/2014 | Kito et al. |
| 2015/0218373 A1 | 8/2015 | Kawada et al. |
| 2018/0327551 A1 | 11/2018 | Kito et al. |
| 2018/0334560 A1 | 11/2018 | Kito et al. |

FOREIGN PATENT DOCUMENTS

| | | |
|---|---|---|
| EP | 0256489 | 2/1988 |
| EP | 0261748 A2 | 3/1988 |
| EP | 0472344 A2 | 2/1992 |
| EP | 3385321 | 10/2018 |
| JP | S63-089550 A | 4/1988 |
| JP | H03-066735 A | 3/1991 |
| JP | H04-096957 A | 3/1992 |
| JP | H04-096969 A | 3/1992 |
| JP | H04-183733 A | 6/1992 |
| JP | H04-202247 A | 7/1992 |
| JP | H07-018088 A | 1/1995 |
| JP | 2000-108263 A | 4/2000 |
| JP | 2001-226537 A | 8/2001 |
| JP | 2003-128057 A | 5/2003 |
| JP | 2003-128846 A | 5/2003 |
| JP | 2005-232353 A | 9/2005 |
| JP | 2006-124558 A | 5/2006 |
| JP | 2007-508426 A | 4/2007 |
| JP | 2007-161963 A | 6/2007 |
| JP | 2009-074081 A | 4/2009 |
| JP | 2009-074082 A | 4/2009 |

(Continued)

OTHER PUBLICATIONS

Korean Office Action dated Jan. 30, 2019 in Korean Application No. 10-2018-7029067.
Office Action dated Nov. 13, 2017 in Japanese Counterpart Patent Application No. JP2016-072743.
Decision to Grant dated Dec. 27, 2017 in Japanese Counterpart Patent Application No. JP2016-072743.
Claims from Japanese Counterpart Patent Application No. JP 2016-072743 as amended on Dec. 18, 2017 and as allowed in the above-noted Decision to Grant dated Dec. 27, 2017.
U.S. Appl. No. 16/073,589, filed Jul. 27, 2018 of International Application No. PCT/JP2017/009805 filed Mar. 10, 2017, Applicant: Toyota Boshoku Kabushiki Kaisha.

(Continued)

*Primary Examiner* — Ana L. Woodward
(74) *Attorney, Agent, or Firm* — Greenblum & Bernstein, P.L.C.

(57) ABSTRACT

Disclosed is a method for adjusting a dispersion diameter to control the dispersion diameter of a dispersed phase in a thermoplastic resin composition having a multiphase structure, and a thermoplastic resin composition obtained by the method. The method includes mixing a polyolefin resin, a polyamide resin, and a compatibilizer and has a continuous phase composed of the polyolefin resin and a dispersed phase dispersed in the continuous phase and composed of the polyamide resin where the compatibilizer is a polymer having a reactive group that reacts with the polyamide resin, and that an amount of the polymer to be mixed based on a total of the polyolefin resin and the polyamide resin is varied to adjust a dispersion diameter of the dispersed phase. This composition has 50 or more but 450 or less the dispersed phase per 10 micrometers square.

15 Claims, 6 Drawing Sheets

(56) References Cited

FOREIGN PATENT DOCUMENTS

| | | |
|---|---|---|
| JP | 2010-195853 A | 9/2010 |
| JP | 2013-129800 A1 | 7/2013 |
| JP | 2013-147645 A | 8/2013 |
| JP | 2013-147646 A | 8/2013 |
| JP | 2013-147647 A | 8/2013 |
| JP | 2013-147648 A | 8/2013 |
| JP | 2014-025060 A | 2/2014 |
| RU | 2005130975 A | 5/2008 |
| WO | 91/02027 A1 | 2/1991 |
| WO | 2004/081107 A1 | 9/2004 |
| WO | 2009/069725 A1 | 6/2009 |
| WO | 2010/107022 A1 | 9/2010 |
| WO | 2012/165140 A1 | 12/2012 |

OTHER PUBLICATIONS

Chinese Office Action dated Jan. 30, 2019 in Counterpart Chinese Patent Application No. 201780010956.2 with English translation thereof.
Russian Office Action dated Mar. 28, 2019 in Russian Application No. 2018136576.
Korean Office Action in corresponding Korean Application No. 10-2018-7029067 dated Sep. 27, 2019 (with machine English translation).
Office Action in corresponding IN Application No. 201817026485, dated Dec. 13, 2019.
Office Action in corresponding KR Application No. 10-2018-7029067, dated Dec. 18, 2019 (with English machine translation).
Extended European Search Report for EP 17774357.2, dated Dec. 9, 2019.
Korean Office Action, Korean Patent Office, Application No. 10-2020-7007798, dated Apr. 6, 2020, with English translation thereof.
Indian Office Action, Indian Patent Office, Application No. 201817026485, dated Aug. 25, 2020.

DISPERSION DIAMETER ADJUSTMENT METHOD AND THERMOPLASTIC RESIN COMPOSITION

TECHNICAL FIELD

The present invention relates to a method for adjusting a dispersion diameter and a thermoplastic resin composition. More specifically, the present invention relates to a method for adjusting a dispersion diameter which is capable of adjusting the dispersion diameter of a dispersed phase in a thermoplastic resin composition having a multiphase structure, and a thermoplastic resin composition that can be obtained by using the method for adjusting a dispersion diameter.

BACKGROUND ART

A conventional technique is known in which different raw material resins are mixed to obtain a resin composition (polymer blend, polymer alloy) having synergistic properties exceeding their respective properties.

For example, studies have been made to obtain a resin composition having a single phase (uniformly-mixed single phase) by uniformly mixing two or more compatible raw material resins.

Further, it is known that there is a case where, even when a resin composition having two or more phases (e.g., a continuous phase and a dispersed phase) is obtained by mixing two or more raw material resins having poor compatibility, the resin composition has synergistic properties exceeding the properties of the raw material resins. Among such techniques, a technique disclosed in the following Patent Literatures 1 to 4 is known as a technique using a polyolefin resin and a polyamide resin as raw material resins having poor compatibility.

Further, a technique is known in which the properties of a resin composition having a multiphase structure are improved by making dispersed particles in the resin composition smaller, that is, by more uniformly mixing raw material resins of the resin composition. As such a technique, one disclosed in the following Patent Literature 5 is known.

CITATIONS LIST

Patent Literatures

Patent Literature 1: JP 2013-147645 A
Patent Literature 2: JP 2013-147646 A
Patent Literature 3: JP 2013-147647 A
Patent Literature 4: JP 2013-147648 A
Patent Literature 5: JP 2010-195853 A

SUMMARY OF INVENTION

Technical Problems

The above Patent Literature 5 discloses that a study has been made to obtain a dispersed phase finer than that obtained by conventional melt-kneading by taking a physical approach of applying a high shear during melt-kneading.

However, the technique disclosed in Patent Literature 5 is intended to obtain a resin composition with the use of a large-size twin screw extruder having a predetermined screw shape and screw structure and an $L/D_0$ of 50 or more (paragraphs [0050] and [0120] to [0123] etc.). Further, the screw rotation speed of the twin screw extruder and the retention time in the twin screw extruder need to be controlled to fall within their respective predetermined ranges (paragraphs [0120] to [0123]). As described above, a special twin screw extruder that is capable of applying a high shear is required to reduce the dispersion diameter of a dispersed phase in a multiphase structure, and in addition, high-level control is required.

In light of the above circumstances, it is an object of the present invention to provide a method for adjusting a dispersion diameter which is capable of controlling the dispersion diameter of a dispersed phase in a thermoplastic resin composition having a multiphase structure by a non-physical approach, if necessary, and a thermoplastic resin composition that can be obtained by using the method for adjusting a dispersion diameter.

Solutions to Problems

In order to achieve the above object, the present invention provides the following.

A method for adjusting a dispersion diameter according to claim 1 is a method for adjusting a dispersion diameter of a dispersed phase in a thermoplastic resin composition that is obtained by mixing a polyolefin resin, a polyamide resin, and a compatibilizer and has a continuous phase composed of the polyolefin resin and a dispersed phase dispersed in the continuous phase and composed of the polyamide resin characterized in that the compatibilizer is a polymer having a reactive group that reacts with the polyamide resin, and that an amount of the polymer to be mixed based on a total of the polyolefin resin and the polyamide resin is varied to adjust a dispersion diameter of the dispersed phase.

A method for adjusting a dispersion diameter according to claim 2 is the method for adjusting a dispersion diameter according to claim 1, wherein the dispersed phase has a fine dispersed phase dispersed in the dispersed phase.

A method for adjusting a dispersion diameter according to claim 3 is the method for adjusting a dispersion diameter according to claim 1 or 2, wherein the compatibilizer is an olefin-based thermoplastic elastomer.

A method for adjusting a dispersion diameter according to claim 4 is the method for adjusting a dispersion diameter according to any one of claims 1 to 3, wherein the reactive group is at least one of an acid anhydride group and a carboxyl group.

A method for adjusting a dispersion diameter according to claim 5 is the method for adjusting a dispersion diameter according to any one of claims 1 to 4, which comprises the step of further melt-kneading a melt-kneaded product, which is obtained by melt-kneading the polyamide resin and the compatibilizer out of the polyolefin resin, the polyamide resin, and the compatibilizer, with the polyolefin resin to obtain the thermoplastic resin composition.

A thermoplastic resin composition according to claim 6 is a thermoplastic resin composition that is obtained by mixing a polyolefin resin, a polyamide resin, and a compatibilizer having a reactive group that reacts with the polyamide resin and has a continuous phase composed of the polyolefin resin and a dispersed phase dispersed in the continuous phase and composed of the polyamide resin, wherein a number of the dispersed phase per 10 micrometers square is 50 or more but 450 or less.

A thermoplastic resin composition according to claim 7 is the thermoplastic resin composition according to claim 6, wherein the dispersed phase has a dispersion diameter of 1300 nm or less.

A thermoplastic resin composition according to claim 8 is the thermoplastic resin composition according to claim 6 or 7, wherein when a total of the polyolefin resin, the polyamide resin, and the compatibilizer is taken as 100% by mass, an amount of the compatibilizer is 11% by mass or more but 45% by mass or less.

A thermoplastic resin composition according to claim 9 is the thermoplastic resin composition according to any one of claims 6 to 8, wherein the reactive group is at least one of an acid anhydride group and a carboxyl group.

A thermoplastic resin composition according to claim 10 is the thermoplastic resin composition according to any one of claims 6 to 9, wherein the dispersed phase has a fine dispersed phase dispersed in the dispersed phase.

Advantageous Effects of Invention

According to the method for adjusting a dispersion diameter of the present invention, it is possible to control the dispersion diameter of a dispersed phase in a thermoplastic resin composition having a multiphase structure by a non-physical approach. More specifically, the dispersion diameter can be adjusted by selecting a predetermined polymer as the compatibilizer and varying the amount of the compatibilizer to be mixed.

In either case where the compatibilizer is an olefin-based thermoplastic elastomer or the reactive group of the compatibilizer is at least one of an acid anhydride group and a carboxyl group, an excellent function of adjusting a dispersion diameter can be fulfilled.

The thermoplastic resin composition according to the present invention having a multiphase structure using a polyolefin resin and a polyamide resin has a very large number of the dispersed phase of 50 or more but 450 or less per 10 micrometers square. This makes it possible to highly achieve both impact resistance and high flexural modulus.

BRIEF DESCRIPTION OF DRAWINGS

The present invention will be further described in the following detailed description based on non-limiting examples of exemplary embodiments of the present invention with reference to the noted drawings, and the same components in some of the drawings are denoted by the same reference signs.

DESCRIPTION OF EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how some of the forms of the present invention may be embodied in practice.

[1] Method for Adjusting Dispersion Diameter

Figure 1:
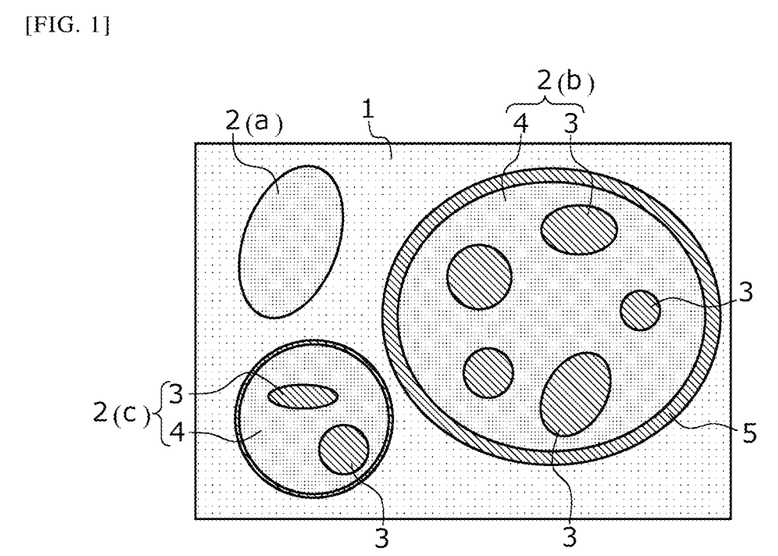
FIG. 1 is a schematic diagram illustrating a multiphase structure of a thermoplastic resin composition.

A method for adjusting a dispersion diameter according to the present invention is intended to adjust the dispersion diameter of a dispersed phase in a thermoplastic resin composition, which is obtained by mixing a polyolefin resin, a polyamide resin, and a compatibilizer and has a continuous phase (1) composed of the polyolefin resin and a dispersed phase (2) dispersed in the continuous phase (1) and composed of the polyamide resin, by using a polymer having a reactive group that reacts with the polyamide resin as the compatibilizer and varying the amount of the polymer to be mixed (see FIG. 1).

A thermoplastic resin composition obtained by the adjusting method usually contains a polyolefin resin, a polyamide resin, and a compatibilizer the whole or part of which has been reacted with the polyamide resin.

In the thermoplastic resin composition, the polyolefin resin constitutes a continuous phase (1), and the polyamide resin constitutes a dispersed phase (2) dispersed in the continuous phase (1) (see FIG. 1, all the reference signs 2(a), 2(b), and 2(c) denote the dispersed phase 2).

The dispersed phase (2) may be a dispersed phase (2(a)) not having a fine dispersed phase (3) further dispersed therein or a dispersed phase (2(b) or 2(c)) having a fine dispersed phase (3) further dispersed therein.

When the dispersed phase (2) has a fine dispersed phase (3), the fine dispersed phase (3) can be composed of the compatibilizer or a reaction product thereof. Further, when having a fine dispersed phase (3), the dispersed phase (2) has a continuous phase (4) therein.

Further, the dispersed phase (2) may have an interfacial phase (5). The interfacial phase (5) is a thick interface between the continuous phase (1) and the dispersed phase (2). The interfacial phase (5) can be formed by, for example, the accumulation of the compatibilizer or a reaction product thereof at the phase boundary. However, the fine dispersed phase (3) and the interfacial phase (5) may have the same composition or different compositions.

According to this adjusting method, the magnitude of dispersion diameter of the dispersed phase (2) out of the above-described phases can be controlled by changing the amount (ratio) of the compatibilizer to be mixed. That is, the dispersion diameter can be controlled to be decreased or increased, if necessary. This control makes it possible to adjust properties that change due to a change in the magnitude of the dispersion diameter. Examples of the properties that can change due to a change in the magnitude of the dispersion diameter include mechanical properties. More specific examples of the properties include impact resistance and bending elasticity.

The reason why the dispersion diameter can be adjusted by varying the amount (ratio) of the compatibilizer to be mixed according to the adjusting method is not clear, but it is considered that the fact that the thermoplastic resin composition contains, as the compatibilizer, a polymer having a reactive group that reacts with the polyamide resin has some effect.

More specifically, it is considered that the reactive group is added to the surface of the polyamide resin by performing kneading at the time when the polyamide resin and the compatibilizer are reacted so that polyamide resin particles are formed which have a reaction product of the compatibilizer bound to the surfaces thereof. Then, the polyamide resin particles having a reaction product of the compatibilizer bound to the surfaces thereof are sheared by further kneading so that the unreacted surface of the polyamide resin appears. Then, the unreacted compatibilizer further reacts with this unreacted surface. It is considered that smaller polyamide resin particles having a reaction product of the compatibilizer bound thereto can be stably formed without applying a high shear by such a repetition of shearing of polyamide resin particles having a reaction product of the compatibilizer bound thereto, appearance of the unreacted surface of the polyamide resin, and the reaction of the unreacted compatibilizer with the unreacted surface.

Further, it is considered that when the amount of the compatibilizer to be supplied in the above process is small, it is difficult to make the polyamide resin particles having a reaction product of the compatibilizer bound thereto small, and when the amount of the compatibilizer to be supplied is sufficiently large, it is easy to make the polyamide resin particles having a reaction product of the compatibilizer bound thereto small. The mixing of the compatibilizer will be described later.

Further, from the viewpoint of the above-described action prediction, the adjusting method preferably includes the step of melt-kneading the polyamide resin and the compatibilizer out of the polyolefin resin, the polyamide resin, and the compatibilizer separately from the polyolefin resin. Further, the adjusting method preferably includes the step of further melt-kneading a melt-kneaded product, which is obtained by melt-kneading the polyamide resin and the compatibilizer, with the polyolefin resin to obtain the thermoplastic resin composition.

This is because in such a case where the adjusting method includes the step of melt-kneading the polyamide resin and the compatibilizer separately from the polyolefin resin, as described above, the unreacted surface of the polyamide resin can be easily formed by shearing polyamide resin particles having a reaction product of the compatibilizer bound thereto, and therefore the adjusting method easily exerts its action.

As described above, the adjusting method is capable of adjusting a dispersion diameter by a chemical approach that is a non-physical approach (control of the type and/or quantitative ratio of the compatibilizer to be mixed to obtain the thermoplastic resin composition). Therefore, according to the adjusting method, it is possible to adjust a dispersion diameter only by the chemical approach of controlling the type and quantitative ratio of the compatibilizer regardless of the presence or absence of a physical approach, and therefore the flexibility of an apparatus to be used to obtain the resin composition can be increased. Further, a conventional physical approach can be used in combination with the chemical approach, which makes it possible to diversify the manufacturing conditions of the resin composition having a multiphase structure.

[1] Components Used in the Adjusting Method
(1) Polyolefin Resin

The polyolefin resin is an olefin homopolymer and/or an olefin copolymer.

An olefin constituting the polyolefin resin is not particularly limited, and examples thereof include ethylene, propylene, 1-butene, 3-methyl-1-butene, 1-pentene, 3-methyl-1-pentene, 4-methyl-1-pentene, 1-hexene, and 1-octene. These olefins may be used singly or in combination of two or more of them.

Specific examples of the polyolefin resin include a polyethylene resin, a polypropylene resin, poly-1-butene, poly-1-hexene, and poly-4-methyl-1-pentene. These polymers may be used singly or in combination of two or more of them. That is, the polyolefin resin may be a mixture of two or more of the above polymers.

Examples of the polyethylene resin include an ethylene homopolymer and a copolymer of ethylene and another olefin. Examples of the latter include an ethylene-1-butene copolymer, an ethylene-1-hexene copolymer, an ethylene-1-octene copolymer, and an ethylene-4-methyl-1-pentene copolymer (the content of an ethylene-derived structural unit is 50% or more of the total structural units).

Examples of the polypropylene resin include a propylene homopolymer and a copolymer of propylene and another olefin.

Examples of the other olefin constituting the copolymer of propylene and another olefin include the above-mentioned various olefins (except for propylene). Among them, for example, ethylene and 1-butene are preferred. That is, the copolymer of propylene and another olefin is preferably a propylene-ethylene copolymer or a propylene-1-butene copolymer.

Further, the copolymer of propylene and another olefin may be either a random copolymer or a block copolymer. Among them, a block copolymer is preferred in terms of excellent mechanical strength. Particularly, a propylene-ethylene block copolymer having ethylene as another olefin is preferred. This propylene-ethylene block copolymer is a block copolymerized polypropylene having an ethylene block as a dispersed phase. More specifically, the propylene-ethylene block copolymer is a polypropylene resin having a continuous phase composed of homopolypropylene and a dispersed phase present in the continuous phase and containing polyethylene. Such a block copolymerized polypropylene having an ethylene block as a dispersed phase is also called, for example, an impact copolymer, a polypropylene impact copolymer, a heterophasic polypropylene, or a heterophasic block polypropylene. This block copolymerized polypropylene is preferred in terms of excellent mechanical strength.

It is to be noted that the content of a propylene-derived structural unit of the copolymer of propylene and another olefin is 50% or more of the total structural units.

The weight-average molecular weight (based on polystyrene standards) of the polyolefin resin measured by gel permeation chromatography (GPC) is not particularly limited, and may be, for example, 10,000 or more but 500,000 or less, but is preferably 100,000 or more but 450,000 or less, more preferably 200,000 or more but 400,000 or less.

It is to be noted that the polyolefin resin is a polyolefin that has no affinity for the polyamide resin, which will be described later, and that has no reactive group capable of reacting with the polyamide resin, either. The polyolefin resin is different from the compatibilizer in this point.

(2) Polyamide Resin

The "polyamide resin" is a polymer having a chain-like skeleton formed by polymerizing a plurality of monomers via amide bonds (—NH—CO—).

Examples of a monomer constituting the polyamide resin include: amino acids such as 6-aminocaproic acid, 11-aminoundecanoic acid, 12-aminododecanoic acid, and para-aminomethylbenzoic acid; and lactams such as ε-caprolactam, undecane lactam, and ω-lauryllactam. These olefins may be used singly or in combination of two or more of them.

Further, the polyamide resin can be obtained also by copolymerization of a diamine and a dicarboxylic acid. In this case, examples of the diamine as a monomer include: aliphatic diamines such as ethylenediamine, 1,3-diaminopropane, 1,4-diaminobutane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane, 2-methyl-1,5-diaminopentane, and 2-methyl-1,8-diaminooctane; alicyclic diamines such as cyclohexanediamine and bis-(4-aminocyclohexyl)methane; and aromatic diamines such as xylylenediamines (e.g., p-phenylenediamine and m-phenylenediamine). These olefins may be used singly or in combination of two or more of them.

Further, examples of the dicarboxylic acid as a monomer include: aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, brasylic acid, tetradecanedioic acid, pentadecanedioic acid, and octadecanedioic acid; alicyclic dicarboxylic acids such as cyclohexanedicarboxylic acids; and aromatic dicarboxylic acids such as phthalic acid, terephthalic acid, isophthalic acid, and naphthalene dicarboxylic acid. These olefins may be used singly or in combination of two or more of them.

Specific examples of the polyamide resin include polyamide 6, polyamide 66, polyamide 11, polyamide 610, polyamide 612, polyamide 614, polyamide 12, polyamide 6T, polyamide 6I, polyamide 9T, polyamide M5T, polyamide 1010, polyamide 1012, polyamide 10T, polyamide MXD6, polyamide 6T/66, polyamide 6T/6I, polyamide 6T/6I/66, polyamide 6T/2M-5T, and polyamide 9T/2M-8T. These polyamides may be used singly or in combination of two or more of them.

In the present invention, among the above-described various polyamide resins, plant-derived polyamide resins can be used. Plant-derived polyamide resins are preferred from the viewpoint of environmental protection (particularly from the viewpoint of carbon neutral) because they are resins using monomers derived from plant-derived components such as vegetable oils.

Examples of the plant-derived polyamide resins include polyamide 11 (hereinafter, also simply referred to as "PA11"), polyamide 610 (hereinafter, also simply referred to as "PA610"), polyamide 612 (hereinafter, also simply referred to as "PA612"), polyamide 614 (hereinafter, also simply referred to as "PA614"), polyamide 1010 (hereinafter, also simply referred to as "PA1010"), polyamide 1012 (hereinafter, also simply referred to as "PA1012"), and polyamide 10T (hereinafter, also simply referred to as "PA10T"). These olefins may be used singly or in combination of two or more of them.

Among the above plant-derived polyamide resins, PA11 has a structure in which monomers having 11 carbon atoms are linked via amide bonds. PA11 can be obtained using aminoundecanoic acid derived from castor oil as a monomer. The content of a structural unit derived from the monomer having 11 carbon atoms in PA11 is preferably 50% or more or may be 100% of all the structural units of PA11.

PA610 has a structure in which monomers having 6 carbon atoms and monomers having 10 carbon atoms are linked via amide bonds. PA610 can be obtained using sebacic acid derived from castor oil as a monomer. The total content of a structural unit derived from the monomer having 6 carbon atoms and a structural unit derived from the monomer having 10 carbon atoms in PA610 is preferably 50% or more or may be 100% of all the structural units of PA610.

PA1010 has a structure in which a diamine having 10 carbon atoms and a dicarboxylic acid having 10 carbon atoms are copolymerized. PA1010 can be obtained using 1,10-decanediamine (decamethylenediamine) and sebacic acid, which are derived from castor oil, as monomers. The total content of a structural unit derived from the diamine having 10 carbon atoms and a structural unit derived from the dicarboxylic acid having 10 carbon atoms in PA1010 is preferably 50% or more or may be 100% of all the structural units of PA1010.

PA614 has a structure in which monomers having 6 carbon atoms and monomers having 14 carbon atoms are linked via amide bonds. PA614 can be obtained using a plant-derived dicarboxylic acid having 14 carbon atoms as a monomer. The total content of a structural unit derived from the monomer having 6 carbon atoms and a structural unit derived from the monomer having 14 carbon atoms in PA614 is preferably 50% or more or may be 100% of all the structural units of PA614.

PA10T has a structure in which a diamine having 10 carbon atoms and terephthalic acid are linked via amide bonds. PA10T can be obtained using 1,10-decanediamine (decamethylenediamine) derived from castor oil as a monomer. The total content of a structural unit derived from the diamine having 10 carbon atoms and a structural unit derived from terephthalic acid in PA10T is preferably 50% or more or may be 100% of all the structural units of PA10T.

Among the above five plant-derived polyamide resins, PA11 is superior to the other four plant-derived polyamide resins in terms of low water absorbability, low specific gravity, and high biomass degree.

Polyamide 610 is inferior to PA11 in water absorption rate, chemical resistance, and impact strength, but is excellent in heat resistance (melting point) and rigidity (strength). Further, polyamide 610 is superior to polyamide 6 or polyamide 66 in terms of low water absorbability and excellent size stability, and therefore can be used as an alternative to polyamide 6 or polyamide 66.

Polyamide 1010 is superior to PA11 in heat resistance and rigidity. Further, the biomass degree of polyamide 1010 is comparable to that of PA11, and therefore polyamide 1010 can be used for parts required to have higher durability.

Polyamide 10T has an aromatic ring in its molecular framework, and therefore has a higher melting point and higher rigidity than polyamide 1010. Therefore, polyamide 10T can be used in harsh environments (parts required to have heat resistance, parts on which a force is to be exerted).

The weight-average molecular weight (based on polystyrene standards) of the polyamide resin measured by gel permeation chromatography (GPC) is not particularly limited, and may be, for example, 5,000 or more but 100,000 or less, but is preferably 7,500 or more but 50,000 or less, more preferably 10,000 or more but 50,000 or less.

(3) Compatibilizer

The compatibilizer is a component capable of exhibiting compatibility with both the polyamide resin and the polyolefin resin. Particularly, the compatibilizer used in this method is a polymer having a reactive group that reacts with the polyamide resin. In addition, the compatibilizer is preferably an elastomer.

Examples of the reactive group include an acid anhydride group (—CO—O—OC—), a carboxyl group (—COOH), an epoxy group {—$C_2O$ (a three-membered ring structure composed of two carbon atoms and one oxygen atom)}, an oxazoline group (—$C_3H_4NO$), and an isocyanate group (—NCO). These olefins may be used singly or in combination of two or more of them.

Therefore, the compatibilizer is preferably a modified elastomer (modified product obtained by introducing the above reactive group into the elastomer by modification). Specific examples of such a modified elastomer include an acid-modified elastomer, an epoxy-modified elastomer, and an oxazoline-modified elastomer. Among them, an acid-modified elastomer is preferred, and an acid anhydride-modified elastomer or a carboxylic acid-modified elastomer is more preferred.

The compatibilizer is particularly preferably an elastomer having an acid anhydride group or a carboxyl group in the side chain or at the end of its molecule. The amount of acid modification is not particularly limited. For example, the number of acid anhydride groups or carboxyl groups contained in one molecule of the acid-modified elastomer is preferably 1 or more, more preferably 2 or more but 50 or less, even more preferably 3 or more but 30 or less, particularly preferably 5 or more but 20 or less.

The above compatibilizers may be used singly or in combination of two or more of them.

Examples of the elastomer before modification include an olefin-based elastomer and a styrene-based elastomer. Particularly, the elastomer before modification is preferably an olefin-based elastomer. That is, the elastomer before modification is preferably one having an olefin skeleton.

This olefin skeleton has, as a basic structure, a polymer obtained by using an olefin. Examples of the olefin include ethylene, propylene, and α-olefins having 4 to 8 carbon atoms. Examples of the α-olefin having 4 to 8 carbon atoms include 1-butene, 3-methyl-1-butene, 1-pentene, 3-methyl-1-pentene, 4-methyl-1-pentene, 1-hexene, and 1-octene.

The olefin skeleton may be a homopolymer of any of these olefins, but is preferably a copolymer of two or more olefins, more preferably an olefin-based thermoplastic elastomer. Examples of the olefin-based thermoplastic elastomer include a copolymer of ethylene and an α-olefin having 3 to 8 carbon atoms and a copolymer of propylene and an α-olefin having 4 to 8 carbon atoms.

Specific examples of the copolymer of ethylene and an α-olefin having 3 to 8 carbon atoms include ethylene-propylene copolymers (EPRs), ethylene-1-butene copolymers (EBRs), ethylene-1-pentene copolymers, and ethylene-1-octene copolymers (EORs). Specific examples of the copolymer of propylene and an α-olefin having 4 to 8 carbon atoms include propylene-1-butene copolymers (PBRs), propylene-1-pentene copolymers, and propylene-1-octene copolymers (PORs). These olefins may be used singly or in combination of two or more of them.

Further, the content of an olefin-derived structural unit of the olefin skeleton is preferably 50% or more, but may be 100% of all the structural units constituting the olefin skeleton.

The olefin skeleton may contain a structural unit other than the olefin. Examples of the structural unit other than the olefin include a structural unit derived from a styrene-based compound and a structural unit derived from a conjugated diene compound.

Examples of the styrene-based compound include: styrene; alkylstyrenes such as α-methylstyrene, p-methylstyrene, and p-t-butylstyrene; p-methoxystyrene; and vinylnaphthalene. These olefins may be used singly or in combination of two or more of them.

Examples of the conjugated diene compound include butadiene, isoprene, piperylene, methylpentadiene, phenylbutadiene, 3,4-dimethyl-1,3-hexadiene, and 4,5-diethyl-1,3-octadiene. These olefins may be used singly or in combination of two or more of them.

On the other hand, specific examples of the styrene-based elastomer include styrene-butadiene-styrene copolymers (SBSs), styrene-isoprene-styrene copolymers (SISs), styrene-ethylene/butylene-styrene copolymers (SEBSs), and styrene-ethylene/propylene-styrene copolymers (SEPSs).

Examples of the compatibilizer include a polymer using any monomer capable of introducing a reactive group (compatibilizer obtained by polymerization using a monomer capable of introducing a reactive group), an oxidative degradation product of any polymer (compatibilizer having a reactive group formed by oxidative degradation), and a graft polymer in which an organic acid is grafted on any polymer (compatibilizer having a reactive group introduced by graft polymerization of an organic acid). These olefins may be used singly or in combination of two or more of them. These olefins may be used singly or in combination of two or more of them.

Examples of the monomer capable of introducing a reactive group include: a monomer having a polymerizable unsaturated bond and an acid anhydride group; a monomer having a polymerizable unsaturated bond and a carboxyl group; and a monomer having a polymerizable unsaturated bond and an epoxy group.

Specific examples thereof include: acid anhydrides such as maleic anhydride, phthalic anhydride, itaconic anhydride, succinic anhydride, glutaric anhydride, adipic anhydride, citraconic anhydride, tetrahydrophthalic anhydride, and butenyl succinic anhydride; and carboxylic acids such as maleic acid, itaconic acid, fumaric acid, acrylic acid, methacrylic acid, and citraconic acid. These compounds may be used singly or in combination of two or more of them. Among these compounds, acid anhydrides are preferred, maleic anhydride, phthalic anhydride, and itaconic anhydride are more preferred, and maleic anhydride is particularly preferred.

Therefore, the compatibilizer is preferably an acid-modified α-olefin-based copolymer containing a structural unit derived from an α-olefin having 3 to 8 carbon atoms, more preferably a maleic anhydride-modified elastomer such as a maleic anhydride-modified ethylene-propylene copolymer, a maleic anhydride-modified ethylene-1-butene copolymer, a maleic anhydride-modified ethylene-1-hexene copolymer, or a maleic anhydride-modified ethylene-1-octene copolymer. More specifically, for example, an α-olefin copolymer "TAFMER series" (trade name) manufactured by Mitsui Chemicals, Inc. or "AMPLIFY series" (trade name) manufactured by The Dow Chemical Company can be used.

The weight-average molecular weight (based on polystyrene standards) of the compatibilizer measured by gel permeation chromatography (GPC) is not particularly limited, and may be, for example, 10,000 or more but 500,000 or less, but is preferably 35,000 or more but 500,000 or less, more preferably 35,000 or more but 300,000 or less.

(4) Other Components that can be Used in the Adjusting Method

In the adjusting method, components other than the polyolefin resin, the polyamide resin, and the compatibilizer, such as another thermoplastic resin, may also be used. These olefins may be used singly or in combination of two or more of them.

Examples of the other thermoplastic resin include polyester-based resins (polybutylene terephthalate, polyethylene terephthalate, polycarbonate, polybutylene succinate, polyethylene succinate, and polylactic acid). These olefins may be used singly or in combination of two or more of them.

[2] Mixing in the Adjusting Method

When the total of the polyolefin resin, the polyamide resin component, and the compatibilizer is taken as 100% by mass, the mixing ratio of the compatibilizer is not particularly limited, but is preferably adjusted to fall within the range of 1% by mass or more but 60% by mass or less. The mixing ratio may be adjusted to be less than 1% by mass or more than 60% by mass. However, when the mixing ratio is in the range of 1% by mass or more but 60% by mass or less, the effect of adjusting a dispersion diameter can be particularly easily obtained. That is, when the mixing ratio is within the above range, a dispersion diameter can be remarkably changed. More specifically, the major axis-average diameter of the dispersed phase (2) can be changed within the range of 300 nm or more but 3000 nm or less. The major axis-average diameter can usually be adjusted to be smaller as the mixing ratio of the compatibilizer increases, and can be adjusted to be larger as the mixing ratio of the compatibilizer decreases.

It is to be noted that in this description, the "dispersion diameter" refers to a major axis-average diameter unless otherwise specified.

The mixing ratio of the compatibilizer is more preferably adjusted to fall within the range of 5% by mass or more but 48% by mass or less, even more preferably within the range of 6% by mass or more but 45% by mass or less, even more preferably within the range of 7% by mass or more but 43% by mass or less, even more preferably within the range of 10% by mass or more but 38% by mass or less, even more preferably within the range of 11% by mass or more but 35% by mass or less, even more preferably within the range of 12% by mass or more but 33% by mass or less, even more preferably within the range of 15% by mass or more but 30% by mass or less, even more preferably within the range of 16% by mass or more but 25% by mass or less, even more preferably within the range of 18% by mass or more but 22% by mass or less. When the mixing ratio of the compatibilizer is within such preferred ranges, the dispersion diameter can be adjusted to achieve a steeper distribution.

On the other hand, when the total of the polyolefin resin, the polyamide resin component, and the compatibilizer is taken as 100% by mass, the mixing ratio of the polyolefin resin and the mixing ratio of the polyamide resin are not particularly limited, and the polyolefin resin and the polyamide resin can be appropriately mixed according to desired properties.

For example, the mixing ratio of the polyolefin resin may be 2% by mass or more but 90% by mass or less. The mixing ratio of the polyolefin resin is preferably 5% by mass or more but 85% by mass or less, more preferably 10% by mass or more but 83% by mass or less, even more preferably 15% by mass or more but 80% by mass or less, even more preferably 20% by mass or more but 78% by mass or less, even more preferably 25% by mass or more but 75% by mass or less, even more preferably 30% by mass or more but 73% by mass or less, even more preferably 35% by mass or more but 70% by mass or less.

On the other hand, the mixing ratio of the polyamide resin may be 1% by mass or more but 75% by mass or less. The mixing ratio of the polyamide resin is preferably 3% by mass or more but 70% by mass or less, more preferably 5% by mass or more but 65% by mass or less, even more preferably 7% by mass or more but 60% by mass or less, even more preferably 10% by mass or more but 57% by mass or less, even more preferably 13% by mass or more but 55% by mass or less, even more preferably 15% by mass or more but 50% by mass or less, even more preferably 20% by mass or more but 45% by mass or less.

The thermoplastic resin composition obtained by the adjusting method can have high impact resistance or high flexural modulus or can have both of these properties. More specifically, when the mixing ratio of the compatibilizer determined by conversion based on the mixing ratio is 1% by mass or more but 60% by mass or less, the Charpy impact strength of the thermoplastic resin composition can be adjusted to 5 kJ/m$^2$ or more but 120 kJ/m$^2$ or less. The flexural modulus can be adjusted to 500 MPa or more but 1500 MPa or less. Further, when the mixing ratio of the compatibilizer is 5% by mass or more but 48% by mass or less, the Charpy impact strength can be adjusted to 4 kJ/m$^2$ or more but 90 kJ/m$^2$ or less. The flexural modulus can be adjusted to 500 MPa or more but 1300 MPa or less. Further, when the mixing ratio of the compatibilizer is 7% by mass or more but 43% by mass or less, the Charpy impact strength can be adjusted to 6 kJ/m$^2$ or more but 85 kJ/m$^2$ or less. The flexural modulus can be adjusted to 500 MPa or more but 1250 MPa or less. Further, when the mixing ratio of the compatibilizer is 10% by mass or more but 38% by mass or less, the Charpy impact strength can be adjusted to 8 kJ/m$^2$ or more but 85 kJ/m$^2$ or less. The flexural modulus can be adjusted to 500 MPa or more but 1200 MPa or less.

Further, when the mixing ratio of the compatibilizer is 12% by mass or more but 33% by mass or less, the Charpy impact strength can be adjusted to 10 kJ/m$^2$ or more but 85 kJ/m$^2$ or less. The flexural modulus can be adjusted to 500 MPa or more but 1100 MPa or less. Further, when the mixing ratio of the compatibilizer is 14% by mass or more but 28% by mass or less, a Charpy impact strength of 13 kJ/m$^2$ or more but 80 kJ/m$^2$ or less and a flexural modulus of 500 MPa or more but 1050 MPa or less can be both achieved. Further, when the mixing ratio of the compatibilizer is 16% by mass or more but 25% by mass or less, a Charpy impact strength of 20 kJ/m$^2$ or more but 80 kJ/m$^2$ or less and a flexural modulus of 600 MPa or more but 950 MPa or less can be both achieved. Further, when the mixing ratio of the compatibilizer is 18% by mass or more but 22% by mass or less, a Charpy impact strength of 45 kJ/m$^2$ or more but 75 kJ/m$^2$ or less and a flexural modulus of 5750 MPa or more but 900 MPa or less can be both achieved.

The adjusting method can be performed using a conventionally-known apparatus capable of performing melt-kneading. More specifically, the melt-kneading can be performed using a kneading apparatus such as an extruder (e.g., a single screw extruder or a twin screw kneading extruder), a kneader, or a mixer (e.g., a high-speed flow mixer, a paddle mixer, or a ribbon mixer). These apparatuses may be used singly or in combination of two or more of them. When two or more of the apparatuses are used, they may be operated continuously or batch-wise. Further, all the raw materials may be mixed at a time or may be mixed by adding them in several batches (multistage addition).

Further, as described above, when the polyamide resin and the compatibilizer are previously melt-kneaded (first melt-kneading), and then the thus obtained melt-kneaded product is further melt-kneaded with the polyolefin resin (second melt-kneading), the kneading temperature of the first melt-kneading is preferably 190° C. or more but 350° C. or less, more preferably 200° C. or more but 330° C. or less, even more preferably 205° C. or more but 310° C. or less.

Further, the kneading temperature of the second melt-kneading is preferably 190° C. or more but 350° C. or less, more preferably 200° C. or more but 300° C. or less, even more preferably 205° C. or more but 260° C. or less.

It is to be noted that the melt-kneaded product obtained by first melt-kneading may be solidified by, for example, pelletization, or may be kept in a molten state or softened state when subjected to the second melt-kneading.

[3] Dispersion Diameter Adjusted by the Adjusting Method

According to the adjusting method, the dispersion diameter (2) can be adjusted. More specifically, the major axis-average diameter can be adjusted to be smaller as the mixing ratio of the compatibilizer increases, and the major axis-average diameter can be adjusted to be larger as the mixing ratio of the compatibilizer decreases.

For example, when the mixing ratio of the compatibilizer is in the range <1> of 1% by mass or more but 60% by mass or less per 100% by mass of the total of the polyolefin resin, the polyamide resin component, and the compatibilizer, the major axis-average diameter of the dispersed phase (2) can be changed within the range of 300 nm or more but 3000 nm or less. Further, when the mixing ratio of the compatibilizer is in the range <2> of 7% by mass or more but 43% by mass or less, the major axis-average diameter of the dispersed phase (2) can be changed within the range of 450 nm or more but 2000 nm or less. Further, when the mixing ratio of the compatibilizer is in the range <3> of 12% by mass or more but 33% by mass or less, the major axis-average diameter of the dispersed phase (2) can be changed within the range of 500 nm or more but 1500 nm or less. Further, when the mixing ratio of the compatibilizer is in the range <4> of 18% by mass or more but 22% by mass or less, the major axis-average diameter of the dispersed phase (2) can be changed within the range of 550 nm or more but 1100 nm or less.

That is, when the mixing ratio of the compatibilizer is in the above-described more preferred range (<2> rather than <1>, <3> rather than <2>, <4> rather than <3>), the dispersion diameter can be adjusted by a smaller vary in the mixing ratio of the compatibilizer to achieve a steep distribution.

Further, when the dispersed phase (2) has a fine dispersed phase (3), the dispersion diameter of the fine dispersed phase (3) can be decreased by decreasing the dispersion diameter of the dispersed phase (2) by the adjusting method. Similarly, the dispersion diameter of the fine dispersed phase (3) can be increased by increasing the dispersion diameter of the dispersed phase (2). When the thermoplastic resin composition obtained by the adjusting method has a fine dispersed phase (3), the fine dispersed phase 3 usually has a major axis-average diameter of 50 nm or more but 500 nm or less (which is of course smaller than the major axis-average diameter of the dispersed phase (2)). Further, the major axis-average diameter of the fine dispersed phase at the time when the major axis-average diameter of the dispersed phase 2 exceeds 1700 nm is 250 nm or more, but the major axis-average diameter of the fine dispersed phase at the time when the major axis-average diameter of the dispersed phase 2 is 1700 nm or less is less than 250 nm. Particularly, when the major axis-average diameter of the dispersed phase 2 is 1600 nm or less, the fine dispersed phase can have a major axis-average diameter of 180 nm or more but 225 nm or less.

It is to be noted that the above-described major axis-average diameter is determined in the following manner using the image of a test specimen, which is made of the obtained thermoplastic resin composition, magnified 2500 times or more. The longest diameter of each of 20 dispersed phases (2) randomly selected within a predetermined region of the image is measured, and the average of the measured longest diameters is determined as a first average value. The first average value of each of five different regions in the image is determined, and the average of the first average values is further determined as a major axis-average diameter.

The image to be used for the above measurements is preferably one obtained by subjecting the fracture surface of a test specimen to oxygen plasma etching treatment and then osmium coating treatment and then magnifying the osmium-coated surface of the test specimen by a field emission scanning electron microscope.

[4] (6) Other Components

In the adjusting method, as described above, other components may also be used in addition to the polyolefin resin, the polyamide resin, and the compatibilizer. Examples of the other components include a nucleating agent, an antioxidant, a heat stabilizer, a weathering agent, a light stabilizer, a plasticizer, an ultraviolet absorber, an antistatic agent, a flame retardant, a slip agent, an antiblocking agent, an antifogging agent, a lubricant, a pigment, a dye, a dispersant, a copper inhibitor, a neutralizer, an antifoaming agent, a weld strength improver, a natural oil, a synthetic oil, and a wax.

Examples of the nucleating agent and the reinforcing filler include: silicates such as talc, silica, clay, montmorillonite, and kaolin; carbonates such as calcium carbonate, lithium carbonate, and magnesium carbonate; metal oxides such as alumina, titanium oxide, and zinc oxide; metals such as aluminum, iron, silver, and copper; hydroxides such as aluminum hydroxide and magnesium hydroxide; sulfides such as barium sulfate; carbides such as charcoal and bamboo charcoal; titanides such as potassium titanate and barium titanate; celluloses such as cellulose microfibrils and cellulose acetate; resin fibers such as polyethylene terephthalate fibers, nylon fibers, polyethylene naphthalate fibers, aramid fibers, vinylon fibers, and polyarylate fibers; and carbons such as fullerene and carbon nanotubes.

Examples of the antioxidant include phenol-based compounds, organic phosphite-based compounds, and thioether-based compounds.

Examples of the heat stabilizer include hindered amine-based compounds.

Examples of the ultraviolet absorber include benzophenone-based compounds, benzotriazole-based compounds, and benzoate-based compounds.

Examples of the antistatic agent include nonionic compounds, cationic compounds, and anionic compounds.

Examples of the flame retardant include halogen-based compounds, phosphorus-based compounds (e.g., nitrogencontaining phosphate compounds and phosphate esters), nitrogen-based compounds (e.g., guanidine, triazine, melamine, and derivatives thereof), inorganic compounds (e.g., metal hydroxides), boron-based compounds, silicone-based compounds, sulfur-based compounds, and red phosphorus-based compounds.

Examples of the flame retardant aid include antimony compounds, zinc compounds, bismuth compounds, magnesium hydroxide, and clayey silicate.

[5] Thermoplastic Resin Composition

A thermoplastic resin composition according to the present invention is obtained by mixing a polyolefin resin, a polyamide resin, and a compatibilizer having a reactive group that reacts with the polyamide resin, and has a continuous phase composed of the polyolefin resin and a dispersed phase dispersed in the continuous phase and composed of the polyamide resin characterized in that the number of the dispersed phase per 10 micrometers square is 50 or more but 450 or less.

The phase structure, the polyolefin resin, the polyamide resin, and the compatibilizer described above with reference to the method for adjusting a dispersion diameter can be directly applied to those of this composition. Further, the phase structure of this composition is the same as the phase structure described above with reference to the method for adjusting a dispersion diameter also in that the dispersed phase (2) may have a fine dispersed phase (3) and may further have an interfacial phase (5).

The number of the dispersed phase per 10 micrometers square of the composition is 50 or more but 450 or less. That is, this composition is a thermoplastic resin composition having a high density of the dispersed phase (2). The thermoplastic resin composition can achieve both high impact resistance and high flexural modulus. More specifically, the thermoplastic resin composition can achieve both a Charpy impact strength of 5 kJ/m$^2$ or more and a flexural modulus of 500 MPa or more at the same time. Further, when the number of the dispersed phase per 10 micrometers square is 200 or more but 450 or less, both a Charpy impact strength of 15 kJ/m$^2$ or more but 90 kJ/m$^2$ or less and a flexural modulus of 600 MPa or more but 1100 MPa or less can be achieved at the same time. Further, when the number of the dispersed phase per 10 micrometers square is 210 or more but 450 or less, both a Charpy impact strength of 25 kJ/m$^2$ or more but 80 kJ/m$^2$ or less and a flexural modulus of 600 MPa or more but 900 MPa or less can be achieved at the same time.

Further, the number of the dispersed phase is preferably 53 or more but 425 or less, more preferably 80 or more but 410 or less, even more preferably 100 or more but 390 or less, even more preferably 140 or more but 370 or less, even more preferably 180 or more but 350 or less, even more preferably 200 or more but 330 or less, even more preferably 210 or more but 300 or less.

Further, the dispersed phase of the thermoplastic resin composition having 50 or more but 450 or less dispersed phases per 10 micrometers square can have a dispersion diameter (major axis-average diameter) of 300 nm or more but 3000 nm or less. Further, the dispersed phase can have a dispersion diameter of 350 nm or more but 2800 nm or less, a dispersion diameter of 400 nm or more but 2500 nm or less, a dispersion diameter of 480 nm or more but 2200 nm or less, a dispersion diameter of 510 nm or more but 1800 nm or less, a dispersion diameter of 550 nm or more but 1400 nm or less, or a dispersion diameter of 580 nm or more but 1100 nm or less.

It is to be noted that the dispersion diameter can be measured by the same method as described above with reference to the adjusting method.

The mixing ratio of each of the polyolefin resin, the polyamide resin, and the compatibilizer in the thermoplastic resin composition is not particularly limited, but may be as follows.

When the total of the polyolefin resin, the polyamide resin component, and the compatibilizer is taken as 100% by mass, the mixing ratio of the polyolefin resin may be 2% by mass or more but 90% by mass or less. The mixing ratio of the polyolefin resin is preferably 5% by mass or more but 85% by mass or less, more preferably 10% by mass or more but 83% by mass or less, even more preferably 15% by mass or more but 80% by mass or less, even more preferably 20% by mass or more but 78% by mass or less, even more preferably 25% by mass or more but 75% by mass or less, even more preferably 30% by mass or more but 73% by mass or less, even more preferably 35% by mass or more but 70% by mass or less.

Further, when the total of the polyolefin resin, the polyamide resin component, and the compatibilizer is taken as 100% by mass, the mixing ratio of the polyamide resin may be 1% by mass or more but 75% by mass or less. The mixing ratio of the polyamide resin is preferably 3% by mass or more but 70% by mass or less, more preferably 5% by mass or more but 65% by mass or less, even more preferably 7% by mass or more but 60% by mass or less, even more preferably 10% by mass or more but 57% by mass or less, even more preferably 13% by mass or more but 55% by mass or less, even more preferably 15% by mass or more but 50% by mass or less, even more preferably 20% by mass or more but 45% by mass or less.

Further, when the total of the polyolefin resin, the polyamide resin component, and the compatibilizer is taken as 100% by mass, the mixing ratio of the compatibilizer is preferably 1% by mass or more but 60% by mass or less, more preferably 5% by mass or more but 48% by mass or less, more preferably 6% by mass or more but 45% by mass or less, even more preferably 7% by mass or more but 43% by mass or less, even more preferably 10% by mass or more but 38% by mass or less, even more preferably 11% by mass or more but 35% by mass or less, even more preferably 12% by mass or more but 33% by mass or less, even more preferably 15% by mass or more but 30% by mass or less, even more preferably 16% by mass or more but 25% by mass or less, even more preferably 18% by mass or more but 22% by mass or less.

When the total of the polyamide resin and the compatibilizer in the thermoplastic resin composition is taken as 100% by mass, the mixing ratio of the compatibilizer is preferably 20% by mass or more but 90% by mass or less, more preferably 22% by mass or more but 88% by mass or less, even more preferably 25% by mass or more but 86% by mass or less, even more preferably 27% by mass or more but 75% by mass or less, even more preferably 29% by mass or more but 70% by mass or less, even more preferably 32% by mass or more but 66% by mass or less, even more preferably 36% by mass or more but 60% by mass or less. That is, the mixing ratio of the polyamide resin in the total of the polyamide resin and the compatibilizer is preferably 10% by mass or more but 80% by mass or less, more preferably 12% by mass or more but 78% by mass or less, even more preferably 14% by mass or more but 75% by mass or less, even more preferably 25% by mass or more but 73% by mass or less, even more preferably 30% by mass or more but 71% by mass or less, even more preferably 34% by mass or more but 68% by mass or less, even more preferably 40% by mass or more but 64% by mass or less.

When the mixing ratio of the compatibilizer is within the above range, the dispersed phase to be dispersed can be made smaller. Further, the amount of the polyamide resin having a large specific gravity to be used can be reduced, and therefore the weight of the thermoplastic resin composition can be reduced. At the same time, a molded body obtained using the thermoplastic resin composition has a relaxing appearance with low surface luster, and therefore can offer excellent design flexibility and can be applied to exterior and interior materials that are directly visually recognized.

Further, when the total of the polyolefin resin and the polyamide resin in the thermoplastic resin composition is taken as 100% by mass, the mixing ratio of the polyamide resin is preferably 1.5% by mass or more but 88% by mass or less, more preferably 3% by mass or more but 75% by mass or less, even more preferably 5% by mass or more but 70% by mass or less, even more preferably 10% by mass or more but 65% by mass or less, even more preferably 15% by mass or more but 60% by mass or less, even more preferably 18% by mass or more but 55% by mass or less, even more preferably 20% by mass or more but 50% by mass or less, even more preferably 25% by mass or more but 45% by mass or less. That is, the mixing ratio of the polyolefin resin is preferably 12% by mass or more but 98.5% by mass or less, more preferably 25% by mass or more but 97% by mass or less, more preferably 30% by mass or more but 95% by mass or less, more preferably 35% by mass or more but 90% by mass or less, even more preferably 40% by mass or more but 85% by mass or less, even more preferably 45% by mass or more but 82% by mass or less, even more preferably 50% by mass or more but 80% by mass or less, even more preferably 55% by mass or more but 75% by mass or less.

When the mixing ratio of the polyamide resin is within the above range, the thermoplastic resin composition can have both high impact resistance and high flexural modulus.

When the total of the continuous phase and the dispersed phase in the thermoplastic resin composition is taken as 100% by mass, the ratio of the dispersed phase is preferably 2% by mass or more but 90% by mass or less, more preferably 5% by mass or more but 85% by mass or less, even more preferably 10% by mass or more but 83% by mass or less, even more preferably 15% by mass or more but 80% by mass or less, even more preferably 20% by mass or more but 78% by mass or less, even more preferably 25% by mass or more but 75% by mass or less, even more preferably 30% by mass or more but 73% by mass or less, even more preferably 35% by mass or more but 70% by mass or less. That is, the ratio of the continuous phase is preferably 10% by mass or more but 98% by mass or less, more preferably 15% by mass or more but 95% by mass or less, even more preferably 17% by mass or more but 90% by mass or less, even more preferably 20% by mass or more but 85% by mass or less, even more preferably 22% by mass or more but 80% by mass or less, even more preferably 25% by mass or more but 75% by mass or less, even more preferably 27% by mass or more but 70% by mass or less, even more preferably 30% by mass or more but 65% by mass or less.

When the ratio of the dispersed phase is within the above range, the thermoplastic resin composition can have both high impact resistance and high flexural modulus.

A method for molding the thermoplastic resin composition is not particularly limited, and the thermoplastic resin composition can be subjected to injection molding, extrusion molding (sheet extrusion, profile extrusion), T-die molding, blow molding, injection blow molding, inflation molding, blow molding, vacuum molding, compression molding, press molding, stamping molding, transfer molding, or the like. These olefins may be used singly or in combination of two or more of them.

[6] Molded Body

A thermoplastic resin composition obtained by the adjusting method according to the present invention or the thermoplastic resin composition according to the present invention can be formed into a molded body having the effects of the thermoplastic resin composition. The molded body can be obtained by any method, and a molding method to be used is not particularly limited. The shape, size, thickness, etc. of the molded body are not particularly limited, and the intended use of the molded body is not particularly limited, either. This molded body can be used for, for example, exterior materials, interior materials, structural materials, and shock absorbers for automobiles, railway vehicles, ships, and airplanes. Examples of the molded body used for automobiles include exterior materials for automobiles, interior materials for automobiles, structural materials for automobiles, shock absorbers for automobiles, and parts in engine rooms. Specific examples thereof include bumpers, spoilers, cowlings, front grills, garnishes, hoods, trunk lids, fender panels, door panels, roof panels, instrument panels, center clusters, door trims, quarter trims, roof linings, pillar garnishes, deck trims, tonneau boards, package trays, dashboards, console boxes, kicking plates, switch bases, seat backboards, seat frames, armrests, sunvisors, intake manifolds, engine head covers, engine under covers, oil filter housings, housings of in-car electronic parts (e.g., ECUs and TV monitors), and air filter boxes.

Further, the molded body can be used for, for example, interior materials, exterior materials, and structural materials of buildings, furniture, and the like. Specific examples thereof include door covering materials, door structural materials, and covering materials and structural materials of various kinds of furniture (e.g., desks, chairs, shelves, and chests of drawers). Further, the molded body can also be used for packages, containers (e.g., trays), protecting members, and partition members. Further, the molded body can also be used for housings and structures of household appliances (e.g., flat-panel TVs, refrigerators, washing machines, vacuum cleaners, mobile phones, mobile game machines, and laptop personal computers).

EXAMPLES

Hereinbelow, the present invention will be specifically described with reference to examples.

[1] Preparation of Thermoplastic Resin Compositions and Preparation of Test Specimens Example 1

[1] Preparation of Thermoplastic Resin Compositions (1) Pellets of the following polyamide resin and pellets of the following compatibilizer were dry-blended, then fed into a twin-screw melt-kneading extruder (manufactured by Coperion, screw diameter: 50 mm, L/D=48), and melt-kneaded under conditions of a kneading temperature of 210° C., an extrusion speed of 150 kg/hr, and a screw rotation speed of 500 rpm. The thus obtained melt-kneaded product was pelletized by a pelletizer to obtain pellets of the melt-kneaded product.

Polyamide resin: Nylon 11 resin, manufactured by ARKEMA K.K., product name "Rilsan BMN O", weight-average molecular weight 18,000, melting point 190° C.

Compatibilizer: Maleic anhydride-modified ethylene-butene copolymer (modified EBR), manufactured by Mitsui Chemicals, Inc., product name "TAFMER MH7020", MFR (230° C.)=1.5 g/10 min (2) The pellets of the molten mixture obtained in the above (1) and pellets of the following polyolefin resin were dry-blended, then fed into a twin-screw melt-kneading extruder (manufactured by Coperion, screw diameter: 50 mm, L/D=48), and melt-kneaded under conditions of a kneading temperature of 150° C., an extrusion speed of 500 kg/hr, and a screw rotation speed of 200 rpm. The thus obtained thermoplastic resin composition was pelletized by a pelletizer to obtain pellets of the thermoplastic resin composition.

Second polyolefin resin: Polypropylene resin, homopolymer, manufactured by Japan Polypropylene Corporation, product name "NOVATEC MA1B", weight-average molecular weight 312,000, melting point 165° C.

(3) The pellets obtained in the above (2) were fed into an injection molding machine (manufactured by NISSEI PLASTIC INDUSTRIAL CO., LTD., 40-ton injection molding machine) and injection-molded under injection conditions of a set temperature of 210° C. and a mold temperature of 40° C. to obtain test specimens for measuring physical properties.

(4) According to the above procedure, test specimens for measuring physical properties were obtained which were made of thermoplastic resin compositions of Experimental Examples 1 to 5 each obtained by mixing the compatibilizer (A), the polyamide resin (B), and the polyolefin resin (C) in the following ratio so that the total of them was 100% by mass (see Table 1).

Experimental Example 1

(A) 5% by mass, (B) 25% by mass, (C) 70% by mass

Experimental Example 2

(A) 10% by mass, (B) 25% by mass, (C) 65% by mass

Experimental Example 3

(A) 15% by mass, (B) 25% by mass, (C) 60% by mass

Experimental Example 4

(A) 20% by mass, (B) 25% by mass, (C) 55% by mass

Experimental Example 5

(A) 30% by mass, (B) 25% by mass, (C) 45% by mass manner as in the above (1) except that the following polyamide resin was used.

Polyamide resin: Nylon 610 resin, manufactured by DuPont, product name "Zytel RS LC3060", melting point 223° C.

Polyamide resin: Nylon 612 resin, manufactured by DuPont, product name "Zytel 158 NC010"

Polyamide resin: Nylon 1010 resin, manufactured by DuPont, product name "Zytel RS LC1000 BK385", melting point 203° C.

(6) Pellets of a thermoplastic resin composition were obtained in the same manner as in the above (2) using the pellets of the molten mixture obtained in the above (5). Further, test specimens for measuring physical properties were obtained in the same manner as in the above (3) using the obtained pellets made of thermoplastic resin compositions of Experimental Examples 6 to 11 each obtained by mixing the compatibilizer (A), the polyamide resin (B), and the polyolefin resin (C) in the following ratio so that the total of them was 100% by mass (see Table 2).

Experimental Example 6

(A) 20% by mass, (B) PA610: 25% by mass, (C) 55% by mass

Experimental Example 7

(A) 30% by mass, (B) PA610: 25% by mass, (C) 45% by mass

Experimental Example 8

(A) 20% by mass, (B) PA612: 25% by mass, (C) 55% by mass

Experimental Example 9

(A) 30% by mass, (B) PA612: 25% by mass, (C) 45% by mass

Experimental Example 10

(A) 20% by mass, (B) PA1010: 25% by mass, (C) 55% by mass

Experimental Example 11

(A) 30% by mass, (B) PA1010: 25% by mass, (C) 45% by mass

[2] Evaluations of Molded Bodies for Evaluation (1) Measurement of Charpy Impact Strength Measurement of Charpy impact strength was performed in accordance with JIS K7111-1 using each of the test specimens for evaluation of Examples 1 to 11 obtained in the above [1]. The results are shown in Tables 1 and 2. It is to be noted that in the measurement of Charpy impact strength, impact strength was measured at a temperature of 23° C. by an edgewise test method using a test specimen having a notch (type A).

(2) Observation of Morphology

Figure 2:
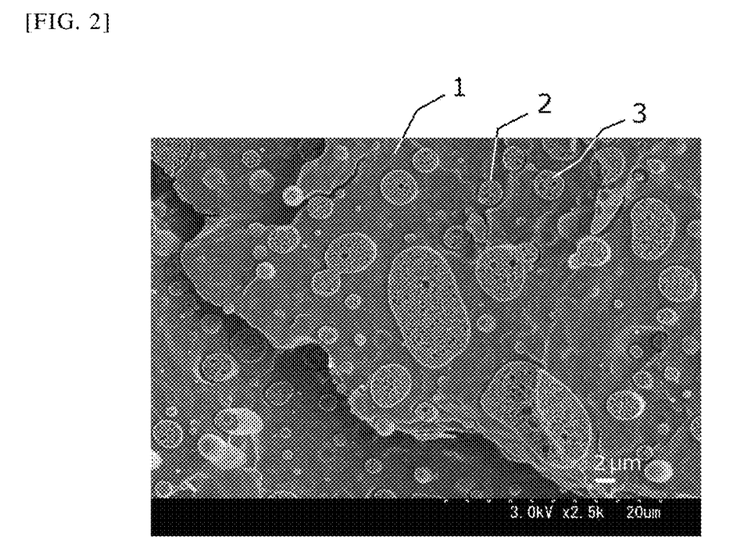
FIG. 2 is an explanatory image obtained by FE-SEM observation of a thermoplastic resin composition (compatibilizer: 5% by mass).
Figure 3:
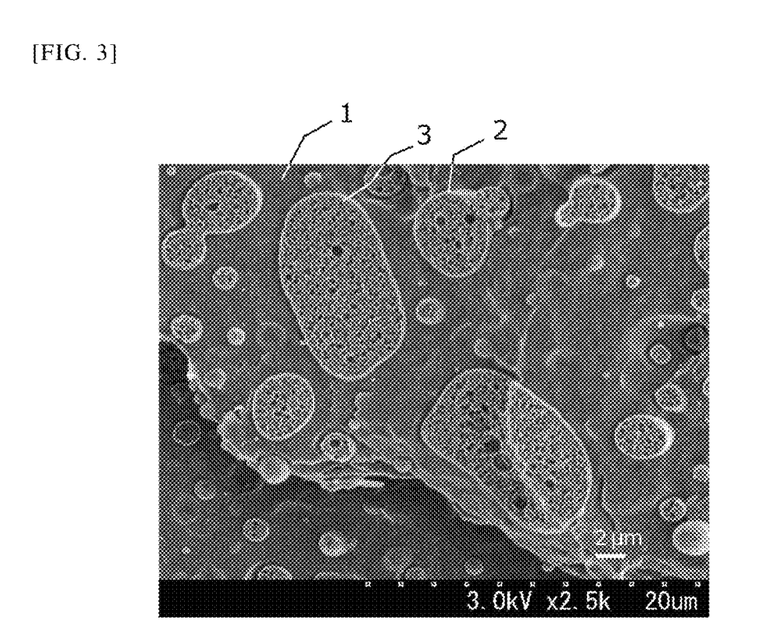
FIG. 3 is a partially-enlarged explanatory image of FIG. 2.
Figure 4:
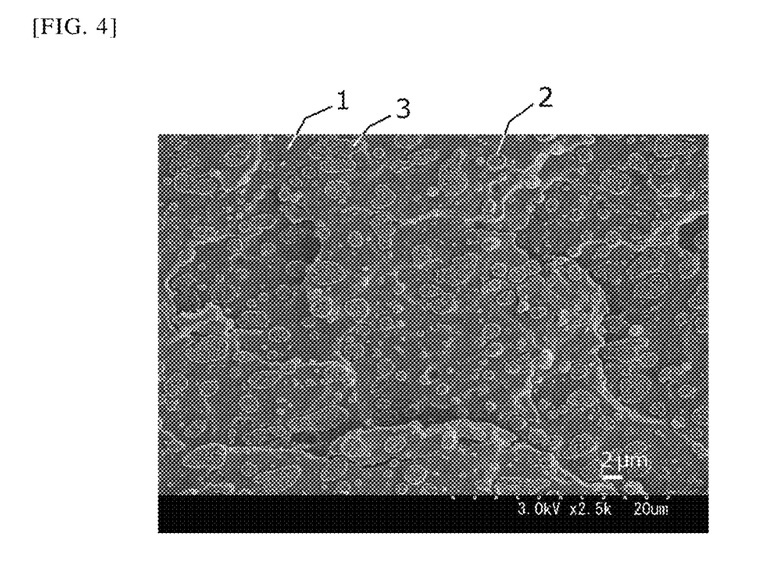
FIG. 4 is an explanatory image obtained by FE-SEM observation of a thermoplastic resin composition (compatibilizer: 10% by mass).
Figure 5:
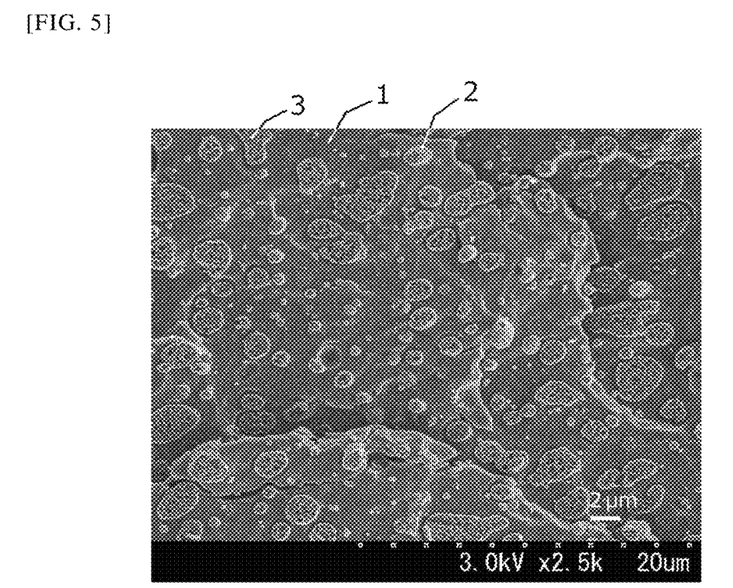
FIG. 5 is a partially-enlarged explanatory image of FIG. 4.
Figure 6:
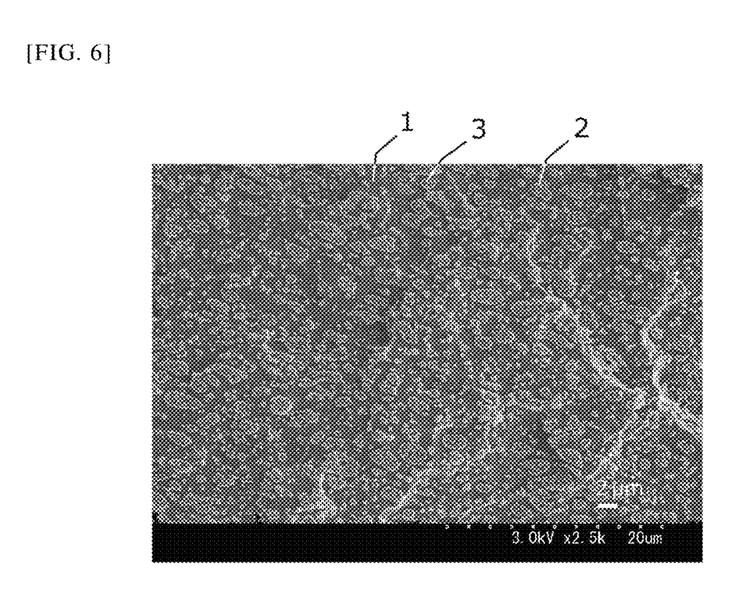
FIG. 6 is an explanatory image obtained by FE-SEM observation of a thermoplastic resin composition (compatibilizer: 20% by mass).
Figure 7:
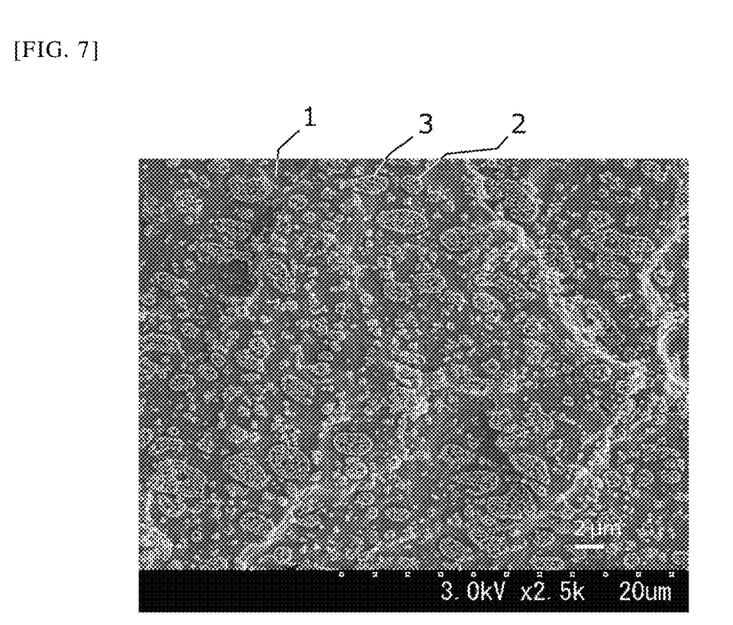
FIG. 7 is a partially-enlarged explanatory image of FIG. 6.

The fracture surface of each of the test specimens that had been subjected to the Charpy impact strength measurement in the above (1) was subjected to oxygen plasma etching treatment at 100 W for 1 minute and then to osmium coating treatment and observed with a field emission scanning electron microscope ("JSM-7100F TTL LV" manufactured by JEOL Ltd.) to obtain an image (FE-SEM image). The result of Example 1 (compatibilizer: 5% by mass) is shown in FIG. 2 and FIG. 3 (partially-enlarged image of FIG. 2), the result of Example 2 (compatibilizer: 10% by mass) is shown in FIG. 4 and FIG. 5 (partially-enlarged image of FIG. 4), and the result of Example 4 (compatibilizer: 20% by mass) is shown in FIG. 6 and FIG. 7 (partially-enlarged image of FIG. 5).

It is to be noted that the component constituting each phase was identified by energy dispersive X-ray spectrometry (EDS) during the above FE-SEM observation. As a result, in all the test specimens, the polyolefin resin constituted a continuous phase 1, and the polyamide resin constituted a dispersed phase 2 dispersed in the continuous phase 1.

Further, the longest diameter (major axis dispersion diameter) of each of 20 dispersed phases (2) randomly selected within each of five different regions in the image obtained above was measured, and the average of the measured longest diameters was determined as a first average value, and the average of the first average values measured in the five different regions was further determined as a major axis-average diameter.

Figure 8:
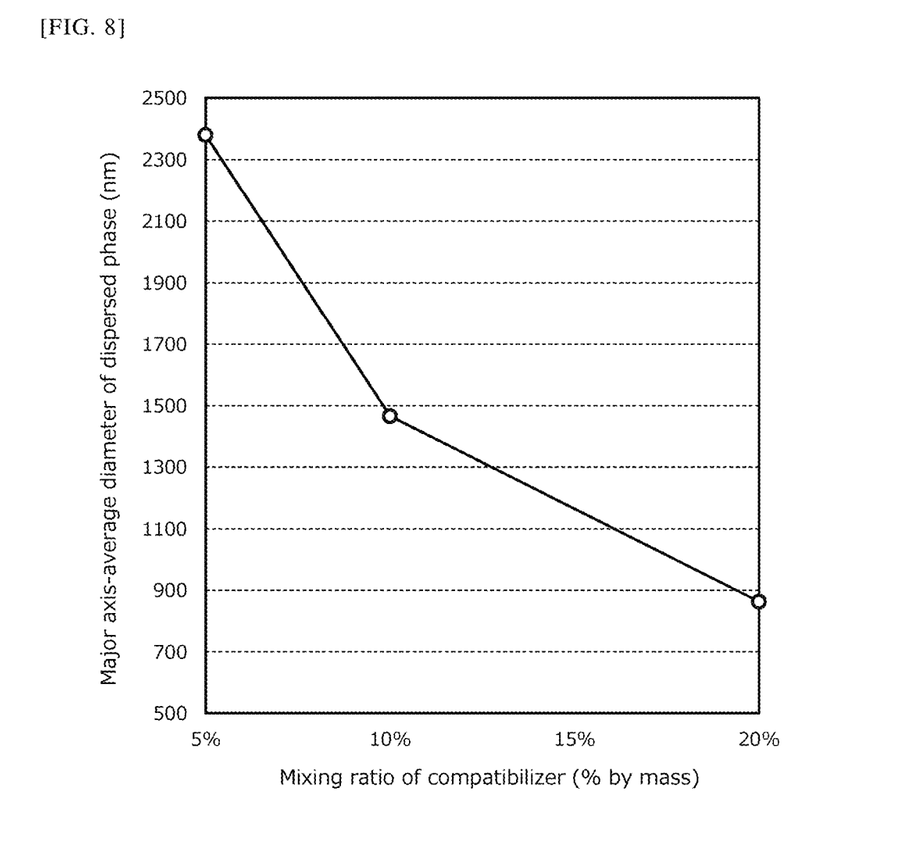
FIG. 8 is a graph showing the correlation between the mixing ratio of a compatibilizer and the major axis-average diameter of dispersed phase.

The results are shown in Table 1, and the correlation between the mixing ratio of the compatibilizer and the major axis-average diameter is graphically shown in FIG. 8.

(3) Measurement of Flexural Modulus

Measurement of flexural modulus was performed in accordance with JIS K7171 using the test specimens for evaluation of Experimental Examples 1 to 11 obtained in the above [1]. The results are shown in Tables 1 and 2. It is to be noted that the measurement of flexural modulus was performed by applying a load at a speed of 2 mm/min from an action point (curvature radius: 5 mm) located at the middle of two supporting points (curvature radius: 5 mm) whose distance (L) was 64 mm while supporting each of the test specimens at the two supporting points.

Figure 9:
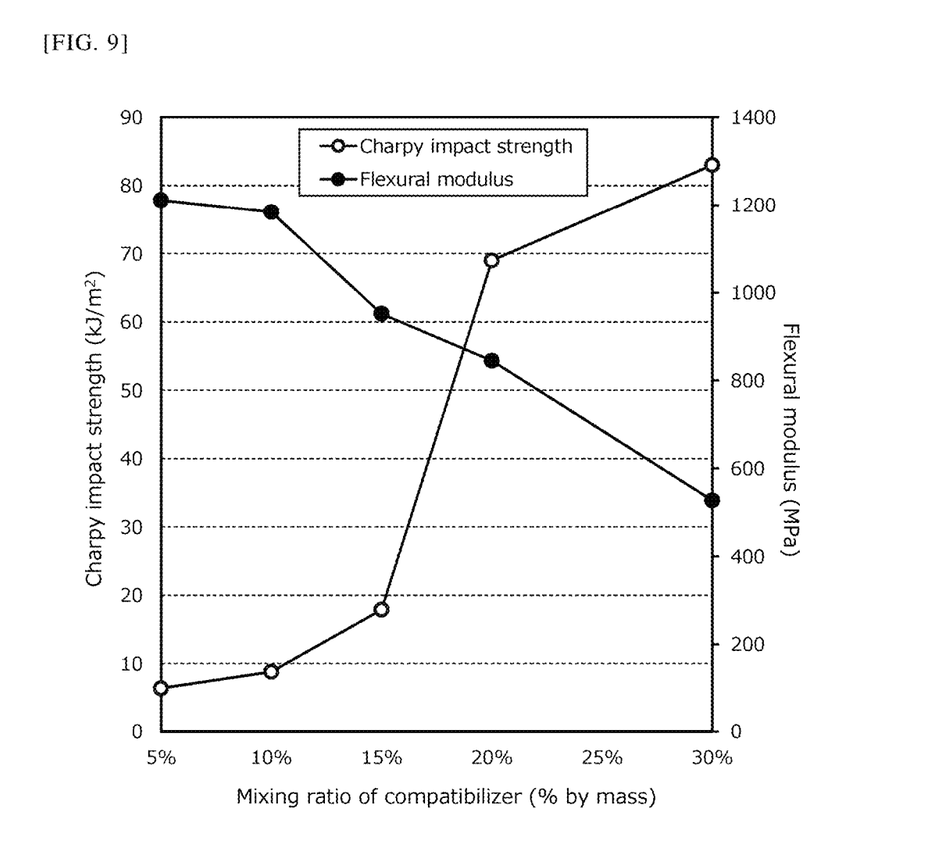
FIG. 9 is a graph showing the correlation between the mixing ratio of a compatibilizer and Charpy impact strength and the correlation between the mixing ratio of a compatibilizer and flexural modulus.

Further, the correlation between the mixing ratio of the compatibilizer and the Charpy impact strength and the correlation between the mixing ratio of the compatibilizer and the flexural modulus are graphically shown in FIG. 9.

TABLE 1

| | | | Experimental Example | | | | |
|---|---|---|---|---|---|---|---|
| | | | 1 | 2 | 3 | 4 | 5 |
| Resin composition | Compatibilizer (% by mass) | Maleic anhydride-modified EBR | 5 | 10 | 15 | 20 | 30 |
| | Polyamide resin (% by mass) | PA11 | 25 | 25 | 25 | 25 | 25 |
| | Polyolefin resin (% by mass) | PP | 70 | 65 | 60 | 55 | 45 |
| Phase structure | Dispersed phase | Presence or absence | Present | Present | — | Present | — |
| | | Number | — | 55 | | 230 | |
| | | Major axis-average diameter (nm) | 2380 | 1466 | | 863 | |
| | Presence or absence of fine dispersed phase | | Present | Present | | Present | |
| | Major axis-average diameter of fine dispersed phase (nm) | | 294 | 206 | | 205 | |
| Charpy impact strength (kJ/m$^2$) | | | 6.4 | 8.8 | 17.9 | 69 | 83 |
| Flexural modulus (MPa) | | | 1211 | 1184 | 952 | 845 | 527 |

TABLE 2

| | | | Experimental Example | | | | | |
|---|---|---|---|---|---|---|---|---|
| | | | 6 | 7 | 8 | 9 | 10 | 11 |
| Resin composition | Compatibilizer (% by mass) | Maleic anhydride-modified EBR | 20 | 30 | 20 | 30 | 20 | 30 |
| | Polyamide resin (% by mass) | PA610 | 25 | 25 | — | — | — | — |
| | | PA612 | — | — | 25 | 25 | — | — |
| | | PA1010 | — | — | — | — | 25 | 25 |
| | Polyolefin resin (% by mass) | PP | 55 | 45 | 55 | 45 | 55 | 45 |
| Phase structure | Presence or absence of dispersed phase | | Present | Present | Present | Present | Present | Present |
| | Number of dispersed phase | | 125 | 400 | 200 | 325 | 125 | 200 |
| | Major axis-average diameter of dispersed phase (nm) | | 626 | 383 | 615 | 519 | 841 | 638 |
| Charpy impact strength (kJ/m$^2$) | | | 10.6 | 28.5 | 15.1 | 67.8 | 18.3 | 78.9 |
| Flexural modulus (MPa) | | | 999 | 602 | 1070 | 774 | 992 | 666 |

[3] Effects of Examples

As can be seen from the results shown in Table 1 and FIG. 8, the dispersion diameter of the dispersed phase 2 can be controlled by increasing or decreasing the amount of the compatibilizer according to the adjusting method of the present invention. That is, the results revealed that the dispersion diameter conventionally controlled only by a physical approach can be controlled by a chemical means.

Further, the results of measurement of Charpy impact strength and flexural modulus of the thermoplastic resin compositions used in Examples as the indicators of mechanical strength revealed that the Charpy impact strength increases as the dispersion diameter decreases. On the other hand, the results revealed that the flexural modulus increases as the dispersion diameter increases (see FIG. 9).

The foregoing examples have been provided merely for the purpose of explanation and are in no way to be construed as limiting of the present invention. Although the present invention has been described with reference to exemplary embodiments, it is understood that the words which have been used in the description and drawings are words of explanation and illustration, rather than words of limitation. Changes may be made within the scope of the appended claims as described in detail herein without departing from the scope and spirit of the present invention in its aspects. Although the present invention has been described in detail with reference to particular structures, materials, and embodiments, the present invention is not intended to be limited to the particulars disclosed herein; rather, the present invention extends to all functionally-equivalent structures, methods, and uses within the scope of the appended claims.

REFERENCE SIGNS LIST

1; Continuous phase
2; Dispersed phase
3; Fine dispersed phase
4; Continuous phase in dispersed phase
5; Interfacial phase

The invention claimed is:

1. A method for adjusting a dispersion diameter of a dispersed phase in a thermoplastic resin composition, the thermoplastic resin composition comprising:
   a polyolefin resin,
   a polyamide resin, and
   a compatibilizer being a polymer having a reactive group that reacts with the polyamide resin;
the thermoplastic resin composition having:
   a continuous phase comprising the polyolefin resin and
   a dispersed phase dispersed in the continuous phase and comprising the polyamide resin; and
   the method comprising:
   measuring a dispersion diameter of the dispersed phase of the thermoplastic resin composition, and
   varying the amount of the compatibilizer based on the total of the amount of the polyolefin resin and the amount of the polyamide resin to obtain an adjusted dispersion diameter of the dispersed phase in the thermoplastic resin composition.

2. The method according to claim 1, wherein the dispersed phase of the thermoplastic resin composition further comprises a dispersed subphase, the dispersed subphase being dispersed in the dispersed phase and comprising the compatibilizer or a reaction product thereof.

3. The method according to claim 2, wherein the reactive group is at least one of an acid anhydride group and a carboxyl group.

4. The method according to claim 2, wherein prior to the measuring, the thermoplastic resin composition is obtained by melt-kneading the polyolefin resin and a melt-kneaded composition comprising the polyamide resin and the compatibilizer.

5. The method according to claim 2, wherein the compatibilizer is an olefin-based thermoplastic elastomer.

6. The method for adjusting a dispersion diameter according to claim 2, wherein in the varying, the adjusted dispersion diameter of the dispersed phase of the thermoplastic resin composition is obtained by melt-kneading the polyolefin resin and a melt-kneaded composition comprising the polyamide resin and the varied amount of the compatibilizer.

7. The method according to claim 1, wherein the compatibilizer is an olefin-based thermoplastic elastomer.

8. The method according to claim 7, wherein the reactive group is at least one of an acid anhydride group and a carboxyl group.

9. The method according to claim 7, wherein prior to the measuring, the thermoplastic resin composition is obtained by melt-kneading the polyolefin resin and a melt-kneaded composition comprising the polyamide resin and the compatibilizer.

10. The method for adjusting a dispersion diameter according to claim 7, wherein in the varying, the adjusted dispersion diameter of the dispersed phase of the thermoplastic resin composition is obtained by melt-kneading the polyolefin resin and a melt-kneaded composition comprising the polyamide resin and the varied amount of the compatibilizer.

11. The method according to claim 1, wherein the reactive group is at least one of an acid anhydride group and a carboxyl group.

12. The method according to claim 11, wherein prior to the measuring, the thermoplastic resin composition is obtained by melt-kneading the polyolefin resin and a melt-kneaded composition comprising the polyamide resin and the compatibilizer.

13. The method for adjusting a dispersion diameter according to claim 11, wherein in the varying, the adjusted dispersion diameter of the dispersed phase of the thermoplastic resin composition is obtained by melt-kneading the polyolefin resin and a melt-kneaded composition comprising the polyamide resin and the varied amount of the compatibilizer.

14. The method according to claim 1, wherein prior to the measuring, the thermoplastic resin composition is obtained by melt-kneading the polyolefin resin and a melt-kneaded composition comprising the polyamide resin and the compatibilizer.

15. The method for adjusting a dispersion diameter according to claim 1, wherein in the varying, the adjusted dispersion diameter of the dispersed phase of the thermoplastic resin composition is obtained by melt-kneading the polyolefin resin and a melt-kneaded composition comprising the polyamide resin and the varied amount of the compatibilizer.

* * * * *